(12) United States Patent
Kuczek et al.

(10) Patent No.: US 10,603,761 B2
(45) Date of Patent: Mar. 31, 2020

(54) DEEP ROLL PEENING SYSTEM AND METHOD

(71) Applicant: United Technologies Corporation, Farmington, CT (US)

(72) Inventors: Andrzej Ernest Kuczek, Bristol, CT (US); Joseph C. Rampone, Colchester, CT (US); Tahany Ibrahim El-Wardany, Bloomfield, CT (US); Paul R. Faughnan, Jr., East Hampton, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 602 days.

(21) Appl. No.: 15/174,136

(22) Filed: Jun. 6, 2016

(65) Prior Publication Data

US 2017/0348821 A1 Dec. 7, 2017

(51) Int. Cl.
*B23P 9/02* (2006.01)
*B24B 39/00* (2006.01)
(Continued)

(52) U.S. Cl.
CPC ............ *B24B 39/003* (2013.01); *B21B 13/12* (2013.01); *B23P 9/02* (2013.01); *C21D 7/08* (2013.01)

(58) Field of Classification Search
CPC .... C21D 7/02; C21D 7/04; C21D 7/08; B23P 9/02; B24B 39/003; B24B 39/006;
(Continued)

(56) References Cited

U.S. PATENT DOCUMENTS 2,944,585 A * 7/1960 Ungerer .................... B21D 5/14
72/163
2,966,722 A * 1/1961 Hull ........................ B24B 39/00
29/90.01
(Continued)

FOREIGN PATENT DOCUMENTS

DE 102004039940 2/2006
EP 2617517 7/2013
WO 2015/142224 A1 * 9/2015 ............. B21B 1/085

OTHER PUBLICATIONS

Translation, WO 2015/142224 A1, Sep. 2015.*
European Search Report for European Patent Application No. 17174633.2 completed Oct. 26, 2017.

*Primary Examiner* — Edward T Tolan
(74) *Attorney, Agent, or Firm* — Carlson, Gaskey & Olds, P.C.

(57) ABSTRACT

A method for deep roll peening a workpiece includes deep roll peening a workpiece by moving the workpiece along a feed path through multiple groups of opposed rollers that are arranged in series. Each group of opposed rollers includes a rim that defines a workpiece engagement surface that exerts a deep roll peening force on the workpiece. A deep roll peening system includes multiple groups of opposed rollers. Each of the opposed rollers is rotatably mounted and has a rim that defines a workpiece engagement surface. The workpiece engagement surfaces are spaced apart from each other by a gap. The groups are arranged in series such that the gaps define a feed path for receiving a workpiece into serial contact with the workpiece engagement surfaces.

19 Claims, 3 Drawing Sheets

(51) Int. Cl.
*C21D 7/08* (2006.01)
*B21B 13/12* (2006.01)

(58) Field of Classification Search
CPC ...... B21D 19/005; B21D 19/04; B21B 1/085; B21B 13/08; B21B 13/12; B21B 13/10; B21B 13/106
See application file for complete search history.

(56) References Cited

U.S. PATENT DOCUMENTS

| | | | |
|---|---|---|---|
| 3,136,029 A | 6/1964 | Kunze | |
| 4,291,559 A * | 9/1981 | Martin | B21H 1/04 29/892.2 |
| 4,309,802 A | 1/1982 | Jorgensen | |
| 4,942,753 A * | 7/1990 | Willeke | B21B 1/088 72/178 |
| 5,549,768 A * | 8/1996 | Mahoney | C21D 7/04 148/695 |
| 5,666,841 A * | 9/1997 | Seeger | B21H 7/16 72/110 |
| 5,826,453 A | 10/1998 | Prevey, III | |
| 7,526,965 B2 * | 5/2009 | Luna | B24B 39/00 73/804 |
| 8,539,805 B2 * | 9/2013 | Massee | B21D 41/04 72/110 |
| 8,763,438 B2 * | 7/2014 | Sato | B21D 5/083 72/176 |
| 8,839,516 B2 * | 9/2014 | Bertoli | B21D 3/16 29/889.1 |
| 2005/0210947 A1 * | 9/2005 | Nagasono | B21D 17/04 72/220 |
| 2008/0302160 A1 * | 12/2008 | Wang | B21C 37/155 72/221 |
| 2013/0026147 A1 * | 1/2013 | Care | G01M 5/0016 219/121.85 |
| 2013/0186161 A1 * | 7/2013 | El-Wardany | B23P 9/02 72/252.5 |
| 2013/0213106 A1 * | 8/2013 | Futamura | B21D 17/04 72/75 |
| 2015/0165513 A1 | 6/2015 | Hawkes et al. | |
| 2015/0165515 A1 | 6/2015 | Hawkes et al. | |

* cited by examiner

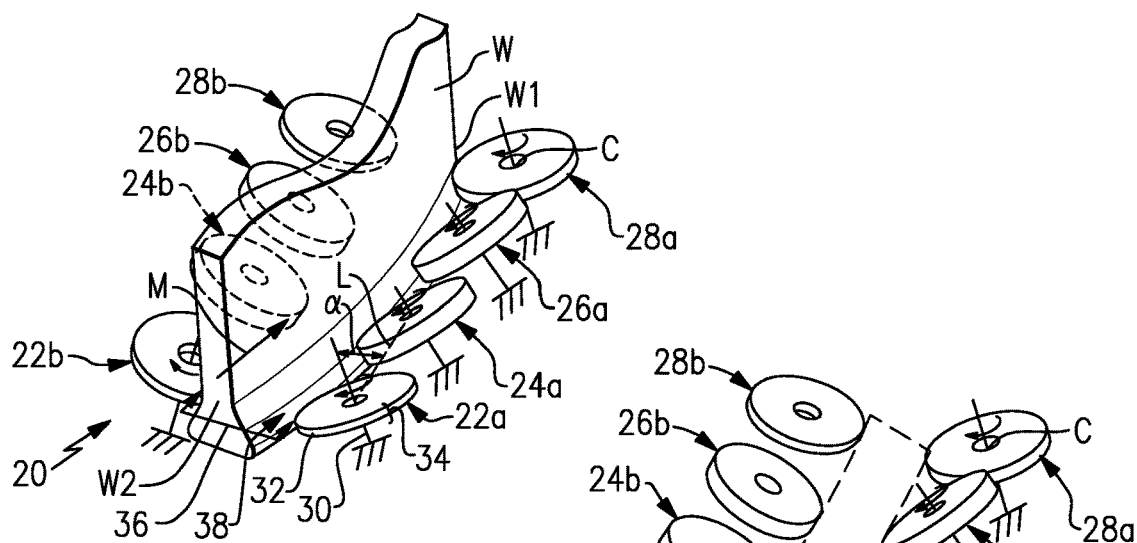
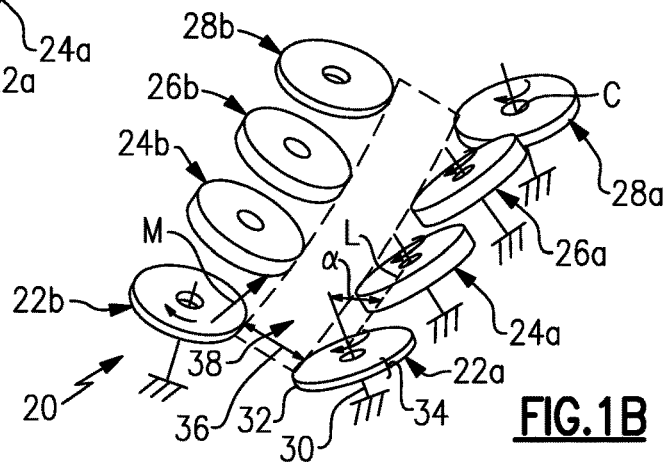
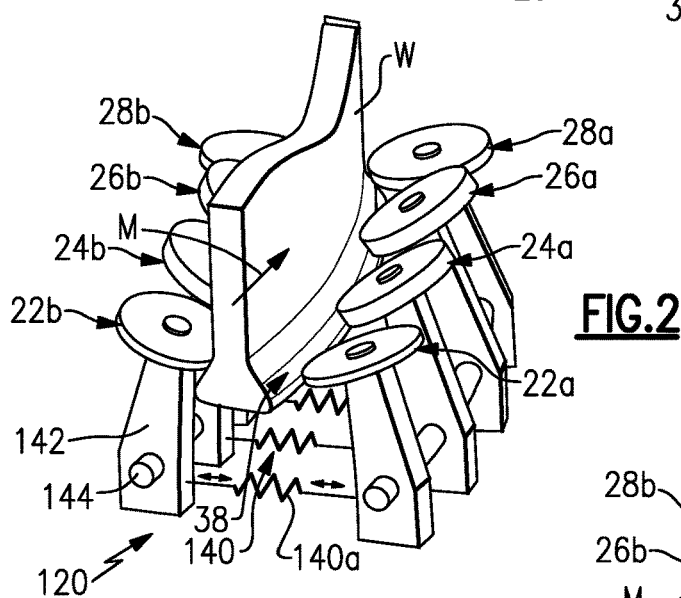
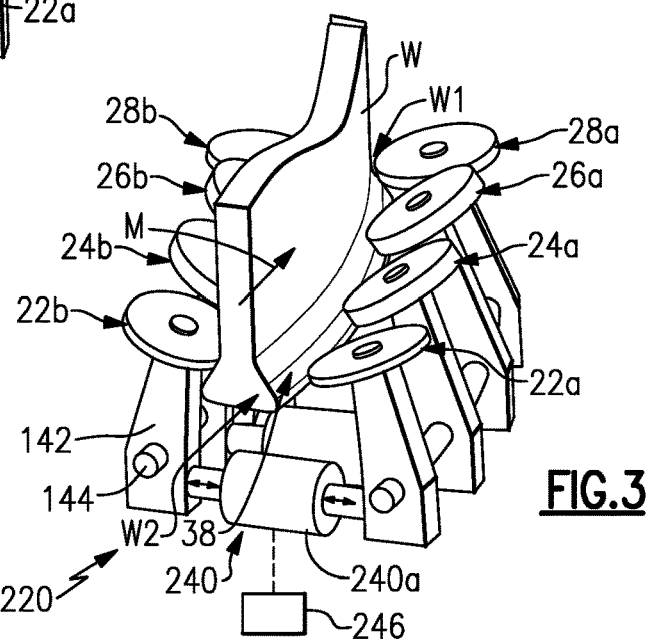

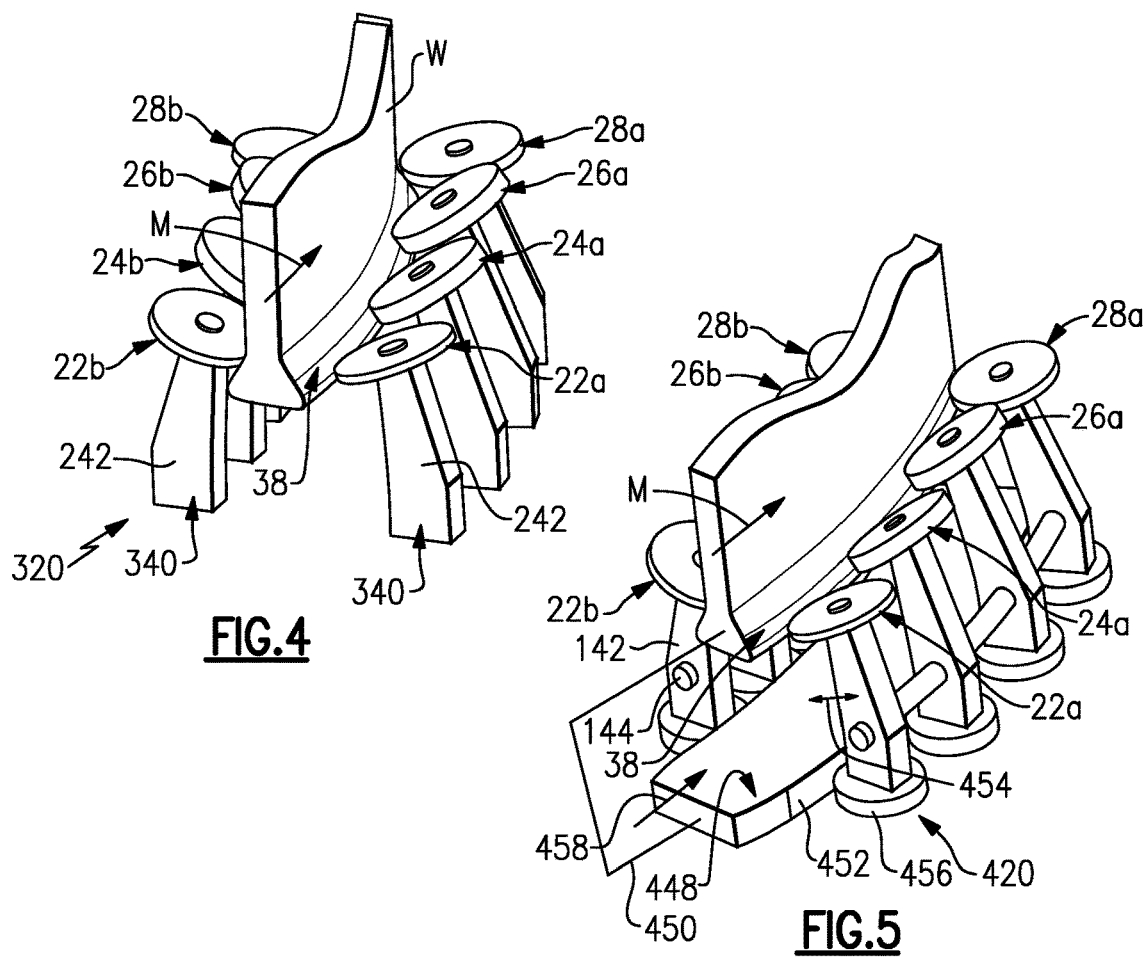
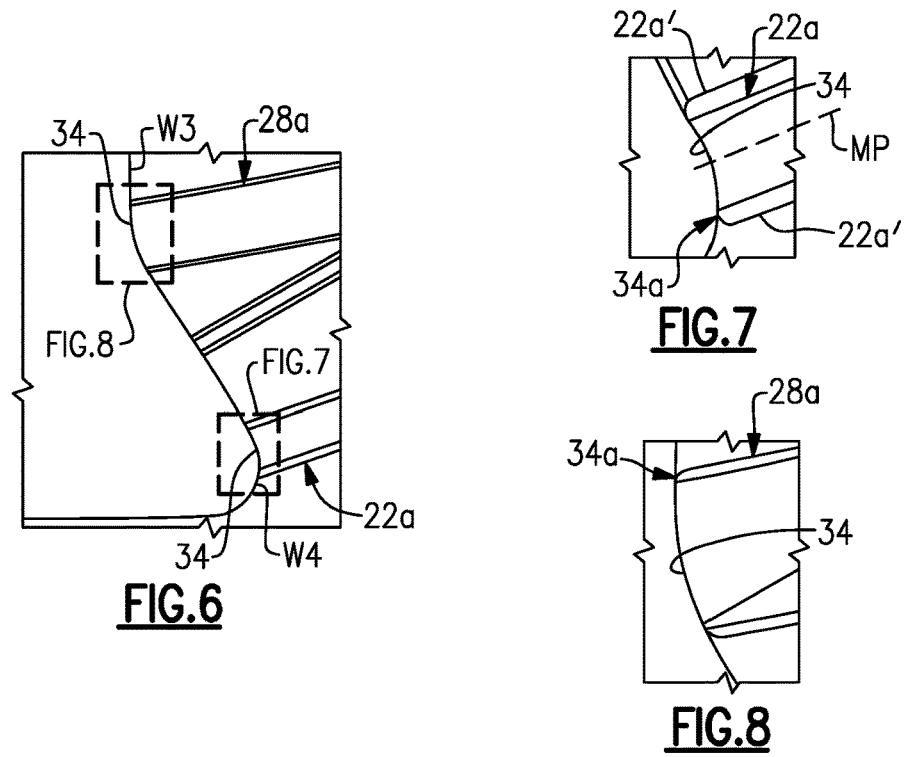

DEEP ROLL PEENING SYSTEM AND METHOD

BACKGROUND

Metal articles may be subjected to a deep roll peening process to improve surface characteristics. Deep roll peening generally involves contacting the metal surface of the article with a tool or object to plastically deform the surface. The interior or core of the article is substantially unaffected. One such tool for deep roll peening includes a deep rolling roller that is held in a socket. The roller is forced against the surface to deform the surface and induce residual compressive stresses. The roller is rolled over the surface in a desired pattern to produce a rolled surface. The pattern may be computer-controlled.

SUMMARY

A method for deep roll peening a workpiece surface according to an example of the present disclosure includes deep roll peening a workpiece surface by moving the workpiece along a feed path through multiple groups of opposed rollers that are arranged in series. Each group of opposed rollers includes a rim that defines a workpiece engagement surface that exerts a deep roll peening force on the workpiece.

A further embodiment of any of the foregoing embodiments includes varying the deep rolling force exerted on the workpiece by at least one of the groups as a function of position of the workpiece along the feed path.

A further embodiment of any of the foregoing embodiments includes varying the deep rolling force exerted on the workpiece by a first or last one of the groups in the series as a function of position of the workpiece along the feed path.

A further embodiment of any of the foregoing embodiments includes moving a cam member in synchronization with movement of the workpiece along the feed path, and moving the opposed rollers of each of the groups in accordance with a profile of the cam member to vary the deep rolling force exerted by each of the groups A further embodiment of any of the foregoing embodiments includes using one or more of the opposed rollers to exert the deep rolling force non-uniformly across the respective workpiece engagement surfaces of the one or more opposed rollers.

A further embodiment of any of the foregoing embodiments includes using an offset between the opposed rollers of the multiple groups to exert the deep rolling force of the respective groups on different regions of the workpiece as the work piece moves along the feed path.

A further embodiment of any of the foregoing embodiments includes using different angular orientations between the opposed rollers of the multiple groups to exert the deep rolling force of the respective groups on different regions of the workpiece as the work piece moves along the feed path.

A further embodiment of any of the foregoing embodiments includes using a force-coupling between the opposed rollers of the respective group to control the deep rolling force exerted by the respective group.

A deep roll peening system according to an example of the present disclosure includes multiple groups of opposed rollers. Each of the opposed rollers has a rim that defines a workpiece engagement surface. The workpiece engagement surfaces of the opposed rollers of each of the groups are spaced apart from each other by a gap. The groups are arranged in series such that the gaps together define a feed path for receiving a workpiece into serial contact with the workpiece engagement surfaces.

In a further embodiment of any of the foregoing embodiments, each group includes a force-coupling operatively connecting the opposed rollers of the respective group.

In a further embodiment of any of the foregoing embodiments, the force-coupling mechanically couples the opposed rollers of the respective group and is selected from the group consisting of a biasing mechanism and a powered actuator.

In a further embodiment of any of the foregoing embodiments, each of the opposed rollers is mounted on a respective support arm.

In a further embodiment of any of the foregoing embodiments, each respective support arm is pivotable such that the respective support arm can move with regard to the feed path.

A further embodiment of any of the foregoing embodiments includes a cam member moveable in synchronization with movement of the workpiece along the feed path. The opposed rollers of each of the groups are moveable as a function of a profile of the cam member to vary a deep rolling force provided by each of the groups.

In a further embodiment of any of the foregoing embodiments, at least two of the workpiece engagement surfaces have different profiles.

In a further embodiment of any of the foregoing embodiments, at least one of the workpiece engagement surfaces has a profile selected from the group consisting of a convex profile, a concave profile, or a combination thereof.

In a further embodiment of any of the foregoing embodiments, at least one of the workpiece engagement surfaces has an asymmetric profile with respect to a midplane of the respective opposed roller.

In a further embodiment of any of the foregoing embodiments, at least one of the workpiece engagement surfaces has an edge inflection at which a curvature of the workpiece engagement surface changes and blends into a broadside face of the at least one roller.

In a further embodiment of any of the foregoing embodiments, the multiple groups include at least first and second groups, and the opposed rollers of the first and second groups that are on a common side of the feed path are differently axially angled or have offset axial center points with regard to the axis of rotation of the opposed roller of the first group on the common side.

A rolled workpiece according to an example of the present disclosure includes a workpiece body having a core region and rolled surface region. The rolled surface region is in a state of compressive stress with respect to the core region. The rolled surface region includes distinct compression bands demarcated by ridges. At least one of the compression bands includes an end section that has a lengthwise graduated compression profile.

In a further embodiment of any of the foregoing embodiments, at least one of the bands has an asymmetric lateral compression profile.

In a further embodiment of any of the foregoing embodiments, the ridges increase in height along the lengthwise graduated compression profile.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1A illustrates an example deep roll peening system and a portion of a workpiece.

FIG. 1B illustrates the deep roll peening system of FIG. 1A but excludes the workpiece.

FIG. 2 illustrates an example deep roll peening system that has a spring force-coupling.

FIG. 3 illustrates an example deep roll peening system that has a powered actuator force-coupling.

FIG. 4 illustrates an example deep roll peening system that has support arms that serve as a force-coupling.

FIG. 5 illustrates an example deep roll peening system that has a cam member.

FIG. 6 illustrates example profiles of workpiece engagement by rollers of a deep roll peening system.

FIG. 7 illustrates a magnified view of one of the workpiece engagement profiles in FIG. 6.

FIG. 8 illustrates a magnified view of another of the workpiece engagement profiles in FIG. 6.

DETAILED DESCRIPTION

Figure 9A:
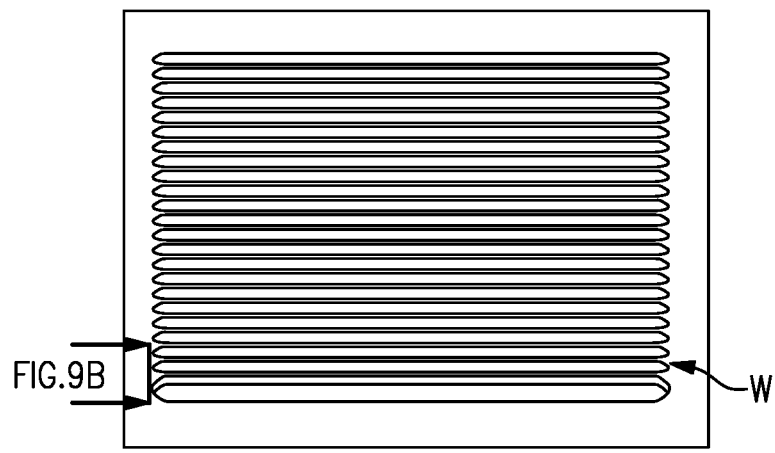
FIG. 9A illustrates a workpiece after a deep roll peening process.

FIG. 1A schematically illustrates an example deep roll peening system 20 (hereafter "system 20") and a portion of a workpiece W undergoing a process of deep roll peening in the system 20. The workpiece W is not particularly limited and may be, for example, an airfoil, a root portion of an airfoil, or other component/structure. Example processes or methods disclosed herein will be described in connection with the description of the system 20. In general, although not limited, the system 20 may be used to apply controlled load, surface deformation and associated plastic deformation during the deep roll peening of the surface of the workpiece W. As known, controlled deformation deep roll peening induces residual stresses in a surface and subsurface region of the workpiece W. The residual stresses alter the mechanical properties of the surface leading to an enhancement of the surface mechanical properties, the fatigue strength and durability of the workpiece W (and thus the end-use article).

In the illustrated example, the system 20 includes multiple groups of opposed rollers 22/24/26/28. The groups are represented in the figures by common numerals. For instance, rollers 22a and 22b are commonly numbered "22" and thus form a first group. Likewise, rollers 24a/24b form a second group, rollers 26a/26b form a third group, and rollers 28a/28b form a fourth group. As will be described in further detail below, a "group" includes rollers that provide opposed, generally balanced reaction forces that roll the workpiece W. Although the example is based on four such groups, the system 20 may have only two groups, only three groups, or more than four groups, as may be appropriate for the workpiece geometry and deep roll peening process needs of a particular implementation. Furthermore, designations such as "first," "second," etc. are generally used herein to indicate serial order of the groups but do not necessarily represent how the workpiece W is processed through the system 20. For instance, in the example shown the workpiece W could be introduced into either the first group of rollers 22a/22b or the fourth group of rollers 28a/28b.

Each of the rollers 22/24/26/28 is cylindrical and is rotatably mounted, as represented at 30. The rotatable mounting 30 is not particularly limited and may be a shaft, a bearing, or the like, for example. Each of the rollers 22/24/26/28 has a rim 32 that defines a workpiece engagement surface 34. Generally, the workpiece engagement surface 34 is the profiled radial surface of the roller 22/24/26/28 that engages or contacts the surface of workpiece W as the workpiece W moves relative to the system 20. The workpiece engagement surfaces 34 of each roller 22/24/26/28 can be profiled in accordance with the geometry of the workpiece W to provide a desired deep roll peening effect.

Referring also to FIG. 1B, which excludes the view of the workpiece W, the rollers 22/24/26/28, and thus the workpiece engagement surfaces 34 of each of the groups of rollers 22a/22b, 24a/24b, 26a/26b, and 28a/28b, are spaced apart from each other by respective gaps 36. At least during the deep roll peening process, the distance of the gaps 36 is less than the thickness of the portion of the workpiece W that is to be deep rolled. The groups of rollers 22a/22b, 24a/24b, 26a/26b, and 28a/28b are arranged in series such that the gaps 36 together define a feed path 38 (generally encompassed by the dashed line in FIG. 1B) for receiving the workpiece W into serial contact with the workpiece engagement surfaces 34. The shape of the feed path 38 corresponds to the shape of the portion of the workpiece W that is to contact the workpiece engagement surfaces 34. For instance, the feed path 38 may be straight for a straight workpiece W or curved for a curved workpiece W, such as the root of an airfoil that is curved from leading-to-trailing sides.

As an example, the workpiece W is progressively advanced along the feed path 38, as represented at M, such that the surface region adjacent the leading end W1 of the workpiece W is initially fed into the first group of rollers 22a/22b. As the workpiece W is advanced along the feed path 38, the surface region of the workpiece W adjacent the leading end W1 progressively comes into contact with each subsequent group of rollers 24a/24b, 26a/26b, and 28a/28b. Likewise, each portion of the surface region of the workpiece W behind the surface region adjacent the leading end W1 progressively comes into contact with the groups of rollers 22a/22b, 24a/24b, 26a/26b, and 28a/28b until the surface region adjacent the trailing end W2 of the workpiece W2 exits from between the final, fourth group of rollers 28a/28b.

Each group of rollers 22a/22b, 24a/24b, 26a/26b, and 28a/28b exerts a compressive deep roll peening force on the workpiece W as the workpiece W passes through the system 20. The compressive force is a product of the opposed arrangement of the rollers 22/24/26/28. For instance, rollers 22a/22b exert opposed, generally balanced, forces on the workpiece W to in essence "squeeze" the workpiece W there between and cause plastic deformation in the surface region of the workpiece W. Each "group" thus includes the rollers that provide opposed, generally balanced reaction forces that roll peen the workpiece. Most typically, the rollers of a group will be situated across from each other at a common distance along the feed path 38.

Although the rollers 22/24/26/28 may be arranged at common angular orientations with respect to their axes of rotation and common positions with regard to location of contact on the workpiece W, the rollers 22/24/26/28 may more typically have different angular orientations and different relative positions depending on the geometry of the workpiece W. Different angular orientations and positions may be used, for example, to control the deep roll peening force exerted by a group or differ the location of contact on the workpiece W between the groups.

As an example, the rollers 22a/24a/26a/28a are located on the same, common side of the feed path 38. The rollers 22b/24b/26b/28b are located on the opposed common side of the feed path 38. The angular orientations of at least two of the rollers 22*a*/24*a*/26*a*/28*a* or at least two of the rollers 22*b*/24*b*/26*b*/28*b* are different. For instance, relative to a common reference line (e.g., a vertical line), the angle of the axis of roller 22*a* differs from the angle of the axis of the roller 24*a*. In the illustrated example, the angles of all of the axes of the rollers 22*a*/24*a*/26*a*/28*a* relative to the reference line are non-equal; and the angles of the axes of the rollers 22*b*/24*b*/26*b*/28*b* relative to the reference line are non-equal. Such angles may be used to control how each group of rollers 22*a*/22*b*, 24*a*/24*b*, 26*a*/26*b*, and 28*a*/28*b* exerts and distributes the deep rolling force on the workpiece W.

The relative positions, independent of angular orientation, of at least two of the rollers 22*a*/24*a*/26*a*/28*a* or at least two of the rollers 22*b*/24*b*/26*b*/28*b* are also different. Relative position between any two rollers 22/24/26/28 may be determined by the spatial relationship between axial center points C of the rollers 22/24/26/28. For instance, relative position is determined by an angularity of a line L between the axial center points C of the rollers 22/24/26/28 with respect to an axis of one of the rollers 22/24/26/28. As an example, the line between the center points C of the rollers 22*a*/24*a* forms a non-perpendicular angle α to the axis of the roller 22*a*. The non-perpendicularity represents an offset between the rollers 22*a*/24*a*. If the line between the center points C of the rollers 22*a*/24*a* were perpendicular to the axis of the roller 22*a*, the rollers 22*a*/24*a* would be non-offset, or center-flush. In the illustrated example, each roller 22*a*/24*a*/26*a*/28*a* on the common side is offset from each other roller 22*a*/24*a*/26*a*/28*a*; and each roller 22*b*/24*b*/26*b*/28*b* on the opposed common side is offset from each other roller 22*b*/24*b*/26*b*/28*b*. Such offsets may be used to control the location on the workpiece where each group exerts the deep roll peening force.

Each group of rollers 22*a*/22*b*, 24*a*/24*b*, 26*a*/26*b*, and 28*a*/28*b* may also include a force-coupling between the opposed rollers of the respective group. A "force-coupling" is an operative connection between the opposed rollers of a group which controls and balances the deep rolling force exerted by that group. For instance, the force-coupling can be a mechanical couple that physically connects the given opposed rollers together in a balanced manner, or a relationship couple that controls how the given rollers behave together in a balanced manner.

FIG. 2 illustrates an example system 120 with at least one force-coupling 140. In this example, the system 120 has multiple force-couplings 140. In this disclosure, like reference numerals designate like elements where appropriate and reference numerals with the addition of one-hundred or multiples thereof designate modified elements that are understood to incorporate the same features and benefits of the corresponding elements. Here, each roller 22/24/26/28 is mounted on a respective support arm 142 that is pivotable about pivot 144. Each force-coupling 140 mechanically connects or couples opposed ones of the support arms 142 of the rollers of a given group 22*a*/22*b*, 24*a*/24*b*, 26*a*/26*b*, and 28*a*/28*b*. Thus, the support arms 142 of the first group of rollers 22*a*/22*b* are mechanically coupled together. Likewise, a respective force-coupling 140 mechanically connects each of the second through fourth groups of rollers 24*a*/24*b*, 26*a*/26*b*, and 28*a*/28*b*. Two or more of the groups of rollers 22*a*/22*b*, 24*a*/24*b*, 26*a*/26*b*, and 28*a*/28*b* may also use a common force-coupling 140, although individual force-couplings may provide a greater ability to tailor the deep roll peening force provided by each group.

In the illustrated example, the force-coupling 140 includes a biasing mechanism 140*a*, such as a spring, that is linked to the respective support arms 142. The biasing mechanism 140*a* is configured such that it biases the support arms 142, and thus the respective rollers 22*a*, 22*b*, to move inwards toward the feed path 38 about the respective pivots 144. Thus, each such biasing mechanism 140*a* can be selected with a predesignated elastic response. The biasing mechanisms 140*a* thus allow the deep roll peening force of each respective group of rollers 22*a*/22*b*, 24*a*/24*b*, 26*a*/26*b*, and 28*a*/28*b* to be tailored or, if a common biasing mechanism 140*a* is used for multiple groups, to tailor the deep roll peening force provided by the multiple groups. The biasing mechanisms 140*a* can provide an ability to tailor the deep roll peening force of the system 120.

FIG. 3 illustrates another example system 220 with a force-coupling 240. In this example, the force-coupling 240 includes a powered actuator 240*a*. For example, the powered actuator 240*a* may be, but is not limited to, a hydraulic actuator, a pneumatic actuator, or an electromagnetic actuator. The powered actuator 240*a* is configured to selectively pivot the respective support arms 142 about the respective pivots 144 to move the group of rollers 22*a*/22*b* toward the feed path 38. Thus, each such powered actuator 240*a* can be selected or controlled with a predesignated, and optionally variable, actuation force to tailor the deep roll peening force provided by each respective group of rollers 22*a*/22*b*, 24*a*/24*b*, 26*a*/26*b*, and 28*a*/28*b*. In this regard, each such powered actuator 240*a* may be in communication with a controller 246 that is operable to control operation of the powered actuator 240*a*. The controller 246 may include hardware (e.g., a microprocessor), software, or both, which may be programmed to control the deep roll peening force as described herein, such as in response to, in coordination with, or as a function of the movement or position of the workpiece W along the feed path 38. That is, the controller 246 can provide active control over the deep roll peening force exerted by each group of the rollers 22*a*/22*b*, 24*a*/24*b*, 26*a*/26*b*, and 28*a*/28*b* as a function of position of the workpiece W along the feed path 38.

In a further example, the controller 246 is configured or programmed with a control scheme to produce a graduated compressive stress profile from the leading end W1 and the trailing end W2 of the workpiece W. For instance, the control scheme involves using the respective powered actuators 240*a* to vary the deep roll peening force provided by the first group of rollers 22*a*/22*b*. As an example, the first group of rollers 22*a*/22*b* provides an initial deep roll peening force as the leading end W1 of the workpiece W is initially fed into the system 220. After the surface region adjacent the leading end W1 passes by the first group of rollers 22*a*/22*b*, the initial deep roll peening force is increased to a higher level. For example, the increase can be a single incremental step increase in the deep roll peening force or a smoother, continuous or multi-incremental step increase.

The initial deep roll peening force induces an initial compressive stress in the workpiece W at the surface region adjacent the leading end W1, and the increased deep roll peening force induces a higher compressive stress in the intermediate surface region of the workpiece W behind the leading end W1. There is thus a graduated compressive stress profile from the leading end W1. Each subsequent group of rollers 24*a*/24*b*, 26*a*/26*b*, and 28*a*/28*b* may be likewise controlled to produce a graduated stress profile from the leading end W1 where those groups contact the workpiece W. Similarly, the groups of rollers 22*a*/22*b*, 24*a*/24*b*, 26*a*/26*b*, and 28*a*/28*b* can be controlled with respect to the trailing end W2 to provide a graduated compressive stress profile from the trailing end W2. As can be appreciated, although a graduated compressive stress profile may be most desired at an end or edge of a given workpiece to reduce edge deformation, the deep roll peening forces of the groups of rollers 22a/22b, 24a/24b, 26a/26b, and 28a/28b could be varied as a function of position of the workpiece W to provide a graduated compressive stress profile at any desired location on the work piece W.

FIG. 4 illustrates another example system 320 with a force-coupling 340 of the relationship couple type. In this example, support arms 242 of a given group of the rollers 22a/22b, 24a/24b, 26a/26b, and 28a/28b are operatively connected by controlled properties of the support arms 242. For example, the support arms 242 have mutually controlled spring responses such that they act in cooperation to provide a generally balanced deep roll peening force. Such spring responses may be controlled by the geometry of the support arms 242, the material used to form the support arms 242, or both. Thus, the biasing of the support arms 242 is integral with the support arms 242 via the spring response. Most typically, the support arms 242 will be substantially identical in geometry and material composition to provide substantially equal spring responses. However, the use of differing angular orientations between the given rollers of the group or the use of differently profiled workpiece engagement surfaces 34 between the given rollers of the group may require different, but complimentary, spring responses so that the rollers react in cooperation to provide a generally balanced deep roll peening force. Given this disclosure, one of ordinary skill in the art will be able to determine desirable spring responses through computer simulation and/or simple experimentation.

FIG. 5 illustrates another example system 420 that includes a cam member 448 that is moveable in synchronization with movement of the workpiece W along the feed path 38. For example, the cam member 448 and the work piece W may be linked, as represented at 450, either mechanically or non-mechanically (e.g., by synchronized computerized or manual position control) such that they move in coordination with each other. The cam member 448 has a cam profile 452 and the opposed rollers of each of the groups 22a/22b, 24a/24b, 26a/26b, and 28a/28b are moveable, as represented at 454, as a function of the cam profile 452 (and thus also as a function of position of the workpiece W) to vary the deep roll peening force provided by each of the groups. For instance, each support arm 142 includes a cam follower 456 that tracks the cam profile 452 as the cam member 448 moves (as represented at 458) in coordination with the workpiece W. The cam profile 452 changes along the length of the cam member 448 to either push the cam followers 456 apart or allow the cam followers 456 to move closer together. In this regard, a biasing mechanism similar to the biasing mechanism 140a, or other force-coupling, may be used in conjunction with the cam member 448 to bias the support arms 142 about the pivots 144. The pushing apart of the cam followers 456 causes the support arms 142 to pivot inwards toward the feed path 38 to increase deep roll peening force, and the pulling together of the cam followers 456 causes the support arms 142 to pivot outwards from the feed path 38 to decrease deep roll peening force. As can be appreciated, the location and geometry of the cam member 448 and the cam followers 456 could be modified. For instance, the cam member 448 could be located outboard of the cam followers 456 rather than inboard as shown. Additionally, because of the rotation of the support arms 142 about the pivots 144, the cam profile can be designed accordingly. That is, the orientation of the cam follower 456 will change as the support arms 142 pivot.

As mentioned above, the profiles of the workpiece engagement surfaces 34 can be tailored in accordance with the geometry of the workpiece W to provide a desired deep roll peening effect. FIG. 6 shows several example profiles. For instance, the workpiece engagement surface 34 of the roller 22a is concave and the workpiece engagement surface 34 of the roller 28a is convex. A combination profile could have a concave portion and a convex portion. The profiles generally mirror the profile of the surface region on the workpiece W that the rollers 22a/28a engage. Likewise, all of the rollers 22/24/26/28 may have individually profiled workpiece engagement surfaces 34 that generally mirror the profile of the engaged surface region on the workpiece W.

The profiles of one or more of the workpiece engagement surfaces 34 may also be contoured to control how the deep roll peening force is distributed to the workpiece W. For instance, as shown in FIG. 7, the roller 22a has an edge inflection 34a at which the curvature of the workpiece engagement surface 34 changes and blends into the broadside face 22a' of the roller 22a. The change in curvature and blend serves to gradually reduce the exerted deep roll peening force along the workpiece engagement surface 34 at the edge inflection 34a. As a result, the compression profile exerted by the workpiece engagement surface 34 varies non-uniformly across the workpiece engagement surface 34. In turn, this produces a laterally graduated compression profile in the workpiece W, with a reduction in compression at the edge inflection 34a. Similarly, as shown in FIG. 8, the roller 28a has an edge inflection 34a. Thus, because the roller 22a is the bottommost offset roller and the roller 28a is the topmost offset roller, the lowermost and uppermost sides of the compressive stress region produced in the workpiece W have a gradual transition in compressive stress to the adjacent non-rolled surface regions, represented at W3 and W4 (FIG. 6).

The roller 22a also provides an example of an asymmetric profile. The roller 22a defines a mid plane MP, which is a plane that is perpendicular to the axis of rotation of the roller 22a and that is midway between the broadside faces 22a' of the roller 22a. The profile of the workpiece engagement surface 34 of the roller 22a is asymmetric with respect to the mid plane MP. For example, the asymmetric profile includes different curvatures on each side of the mid plane MP, such as two different concave curvatures, two different convex curvatures, a concave and convex curvature, or combinations of concave and convex curvatures.

Figure 9B:
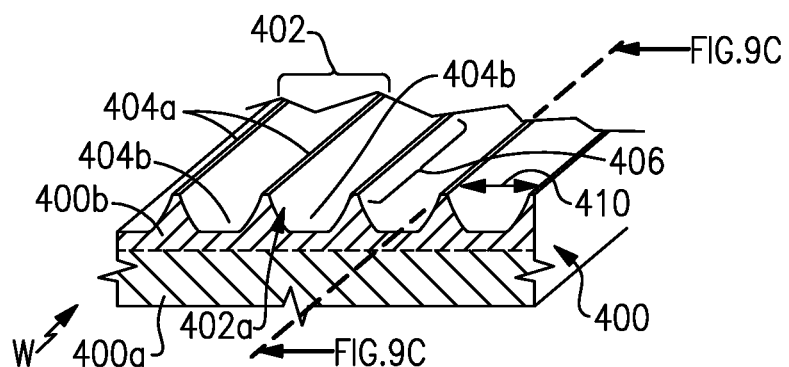
FIGS. 9B and 9C illustrate sectioned views of a workpiece after a deep roll peening process.
Figure 9C:
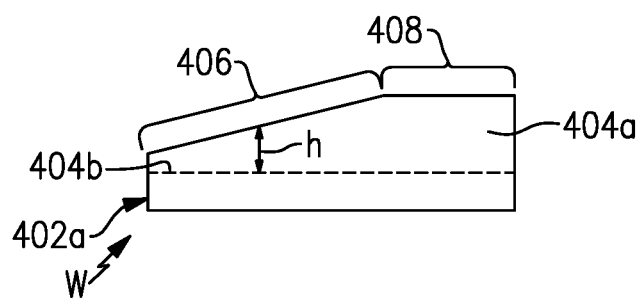

FIG. 9A depicts the workpiece W after deep roll peening, and FIGS. 9B and 9C illustrate sectioned views of the workpiece W. The workpiece W includes a workpiece body 400 having an interior or core region 400a and rolled surface region 400b demarcated by the dashed line in FIG. 9B. The rolled surface region 400b is in a state of compressive stress with respect to the core region 400a. Residual compressive stresses can be detected and measured using known techniques in the art, for instance techniques involving X-ray diffraction. The rolled surface region 400b includes distinct compression bands 402 demarcated by ridges 404a and troughs 404b. One or more of the compression bands 402 includes an end section 402a that has a lengthwise graduated compression profile 406, such as described above in connection with a control scheme of the controller 246. The "lengthwise" direction is the elongated direction of the band 402, which is generally the direction of movement of the workpiece W along the feed path 38. As shown in FIG. 9C, the ridges 404a increase in height, represented at "h," from the end section 402a along the lengthwise graduated compression profile 406. For instance, the increase in height is the distance between the tip of the ridge 404a and the bottom of the trough 404b at a given location. Beyond the graduated compression profile 406, farther into the workpiece W, the workpiece W may have a constant compression profile 408, and thus a constant ridge height, where a constant deep rolling force was exerted.

One or more of the bands 402 may also have an asymmetric lateral compression profile, represented at 410. As used herein, the term "lateral" refers to the local direction that is perpendicular to the local lengthwise direction of a band 402. For example, such an asymmetric lateral compression profile may be produced using a workpiece engagement surface 34 that has an asymmetric profile, as discussed with respect to FIG. 7. In the workpiece W, the asymmetric lateral compression profile may be demarcated by a difference in heights between lateral locations of adjacent ridges 404a of the given band 402.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method for deep roll peening a workpiece surface, the method comprising:
   deep roll peening a workpiece surface by moving the workpiece along a feed path through multiple groups of opposed rollers that are arranged in series along the feed path, each group of opposed rollers includes first and second rollers, the first rollers are rotatable about respective rotational axes, the rotational axes of the first rollers are oriented at respective angles, and the angles of the rotational axes of the first rollers differ from each other, and the second rollers are rotatable about respective rotational axes, the rotational axes of the second rollers are oriented at respective angles, and the angles of the rotational axes of the second rollers differ from each other, and each opposed roller includes a rim that defines a workpiece engagement surface that exerts a deep roll peening force on the workpiece, the first and second rollers straddling the feed path such that the first rollers are on a first common side of the feed path and the second rollers are on a second common side of the feed path, and the first rollers are non-coaxial with each other and the second rollers are non-coaxial with each other.

2. The method as recited in claim 1, further including varying the deep rolling force exerted on the workpiece by at least one of the groups as a function of position of the workpiece along the feed path.

3. The method as recited in claim 1, further including varying the deep rolling force exerted on the workpiece by a first or last one of the groups in the series as a function of position of the workpiece along the feed path.

4. The method as recited in claim 1, further including moving a cam member in synchronization with movement of the workpiece along the feed path, and moving the opposed rollers of each of the groups in accordance with a profile of the cam member to vary the deep rolling force exerted by each of the groups.

5. The method as recited in claim 1, further including using one or more of the opposed rollers to exert the deep rolling force non-uniformly across the respective workpiece engagement surfaces of the one or more opposed rollers.

6. The method as recited in claim 1, further including using an offset between the opposed rollers of the multiple groups to exert the deep rolling force of the respective groups on different regions of the workpiece as the work piece moves along the feed path.

7. The method as recited in claim 1, further including using different angular orientations between the opposed rollers of the multiple groups to exert the deep rolling force of the respective groups on different regions of the workpiece as the work piece moves along the feed path.

8. The method as recited in claim 1, further including using a force-coupling between the opposed rollers of the respective group to control the deep rolling force exerted by the respective group.

9. A deep roll peening system comprising:
   multiple groups of opposed rollers, wherein
      each of the groups of opposed rollers has first and second rollers, wherein the first rollers are rotatable about respective rotational axes, the rotational axes of the first rollers are oriented at respective angles, and the angles of the rotational axes of the first rollers differ from each other, and the second rollers are rotatable about respective rotational axes, the rotational axes of the second rollers are oriented at the respective angles, and the angles of the rotational axes of the second rollers differ from each other,
      each of the opposed rollers has a rim that defines a workpiece engagement surface,
      the workpiece engagement surfaces of the first and second rollers are spaced apart from each other by a gap,
      the groups are arranged in series such that the gaps are also arranged in series and the gaps together define a feed path for receiving a workpiece into serial contact with the workpiece engagement surfaces, the first and second rollers straddling the feed path such that the first rollers are on a first common side of the feed path and the second rollers are on a second common side of the feed path, and
      the first rollers are non-coaxial with each other and the second rollers are non-coaxial with each other.

10. The deep roll peening system as recited in claim 9, wherein each group includes a force-coupling operatively connecting the opposed rollers of the respective group.

11. The deep roll peening system as recited in claim 10, wherein the force-coupling mechanically couples the opposed rollers of the respective group and is selected from the group consisting of a biasing mechanism and a powered actuator.

12. The deep roll peening system as recited in claim 9, wherein each of the opposed rollers is mounted on a respective support arm.

13. The deep roll peening system as recited in claim 12, wherein each respective support arm is pivotable such that the respective support arm can move with regard to the feed path.

14. The deep roll peening system as recited in claim 9, further comprising a cam member moveable in synchronization with movement of the workpiece along the feed path, the opposed rollers of each of the groups being moveable as a function of a profile of the cam member to vary a deep rolling force provided by each of the groups.

15. The deep roll peening system as recited in claim 9, wherein at least two of the workpiece engagement surfaces have different profiles.

16. The deep roll peening system as recited in claim 9, wherein at least one of the workpiece engagement surfaces has a profile selected from the group consisting of a convex profile, a concave profile, or a combination thereof.

17. The deep roll peening system as recited in claim 9, wherein at least one of the workpiece engagement surfaces has an asymmetric profile with respect to a midplane of the respective opposed roller.

18. The deep roll peening system as recited in claim 9, wherein at least one of the workpiece engagement surfaces has an edge inflection at which a curvature of the workpiece engagement surface changes and blends into a broadside face of the at least one roller.

19. The deep roll peening system as recited in claim 9, wherein the multiple groups include at least first and second groups, and the opposed rollers of the first and second groups that are on a common side of the feed path have offset axial center points with regard to the axis of rotation of the opposed roller of the first group on the common side.

* * * * *